April 10, 1956

J. F. ZISKAL 2,741,337

SELECTIVE VEHICLE BRAKE-ENGAGING APPARATUS

Filed April 18, 1951

Inventor:
Joseph F. Ziskal
Paul O. Pippel
Atty.

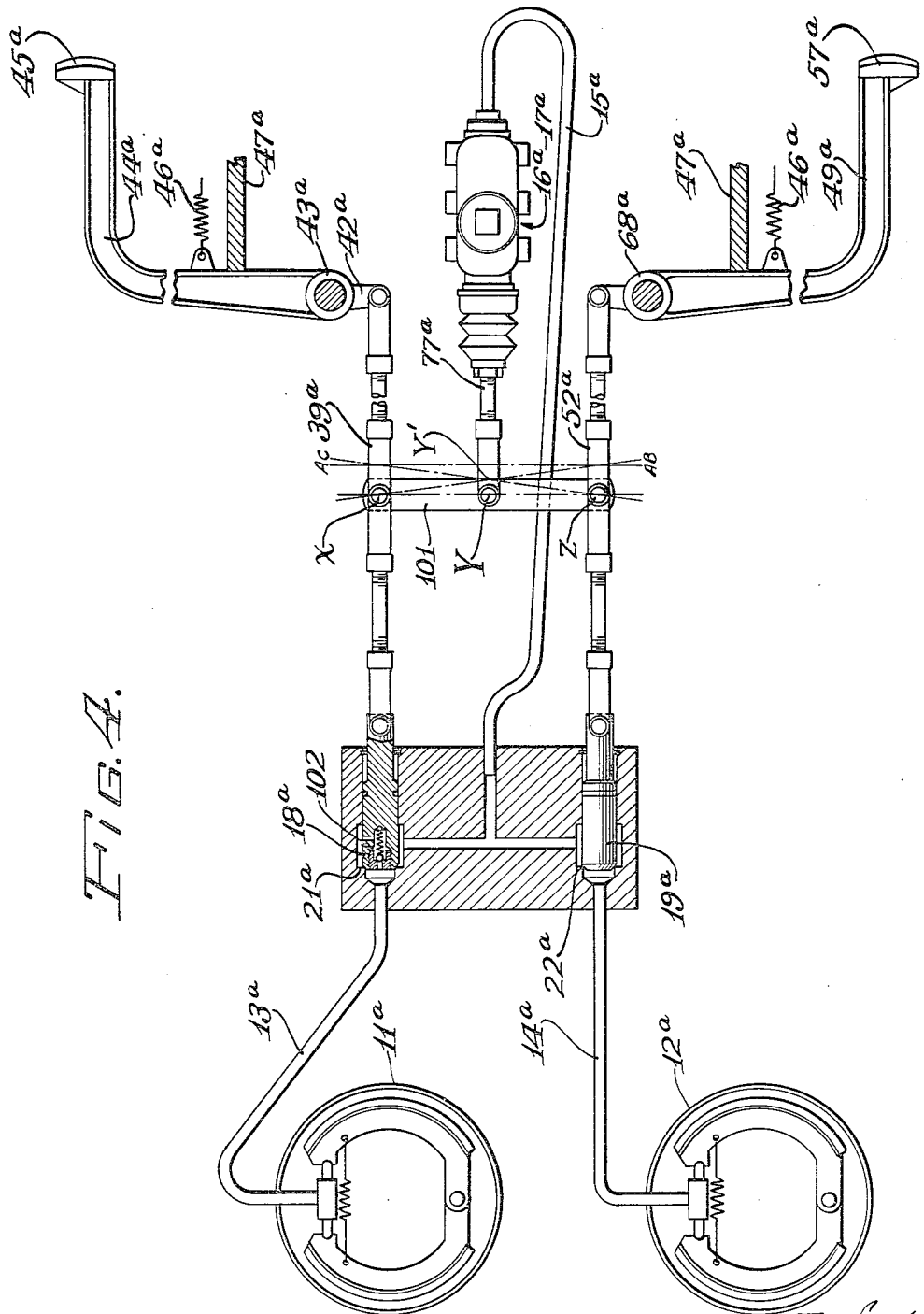

United States Patent Office 2,741,337
Patented Apr. 10, 1956

2,741,337

SELECTIVE VEHICLE BRAKE-ENGAGING APPARATUS

Joseph F. Ziskal, Brookfield, Ill., assignor to International Harvester Company, a corporation of New Jersey Application April 18, 1951, Serial No. 221,570

9 Claims. (Cl. 188—152)

This invention has to do with vehicle brakes and more particularly concerns apparatus for selectively engaging the brakes of traction wheels for agricultural tractors and the like to supplement the effect of steering apparatus for guiding the vehicle.

The present invention is related to and constitutes an improvement over selective brake-controlling apparatus as that shown in U. S. Patent 2,362,521. The system shown in said patent is of the hydraulic type wherein there are selectively engageable brakes which are energized or engaged by the introduction of fluid into brake shoe operating pulsators from a pedal-operated master cylinder. Brake pedals upon the vehicle are respectively associated with traction wheel brakes at opposite sides of the vehicle and these pedals are each adapted to operate the master cylinder when advanced or depressed by the application of pressure upon the foot pads thereof. A fluid line leading from the master cylinder has branches respectively leading to the brake pulsators and there are valves respectively in these branches to be controlled by the pedals. Manual advance of either pedal will incur opening of only the valve in the brake line branch leading to the brake with which such pedal is associated and the directing of fluid from the pedal-operating master cylinder to only this brake. When the pedals are simultaneously operated both valves will be open, causing the brakes to be simultaneously engaged and thus serve as service brakes for the vehicle. One disadvantage of the control apparatus just described is that when the brake pedals are simultaneously advanced causing the fluid to be expelled from the master cylinder to both brakes, the plunger of the master cylinder travels further before causing the brakes to commence engagement and as a consequence the pedal travel is greater before the vehicle operator can commence to apply the brakes than when the brakes are individually applied.

The primary object of this invention is the provision of a selective vehicle brake-engaging apparatus wherein the degree of advancement of brake-controlling members within their range of movement is essentially the same for causing engagement of brakes respectively associated with such members irrespective of whether the members are advanced individually or simultaneously.

A more particular object is the provision in selective brake-engaging apparatus of force differential mechanism between the control members, such as pedals, and the master cylinder in such an arrangement that the master cylinder is operated only one-half the amount per unit of control member travel when either of these members is advanced as when the members are advanced together.

These and other desirable objects inherent in and encompassed by the invention will be more fully understood from the ensuing description, the appended claims and the annexed drawings, wherein:

Fig. 4 is a diagrammatic view illustrating a modified form of the invention utilizing a walking beam type of differential mechanism for transmitting operating force from the brake pedals or operators to the master cylinder.

Figure 1:
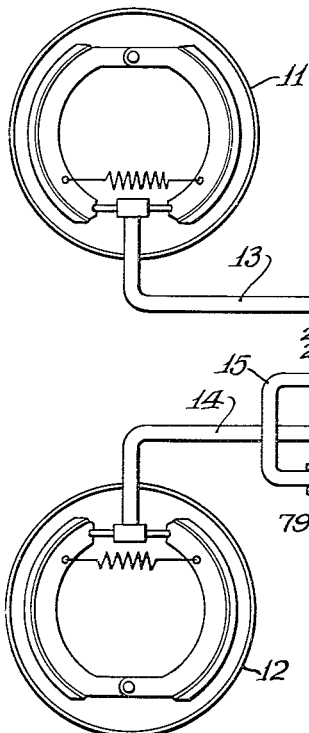
Fig. 1 is a partly diagrammatic view of apparatus constructed in accordance with this invention and wherein a master cylinder, brake line valves and a frame for components of a differential mechanism are shown in cross section.
Figure 2:
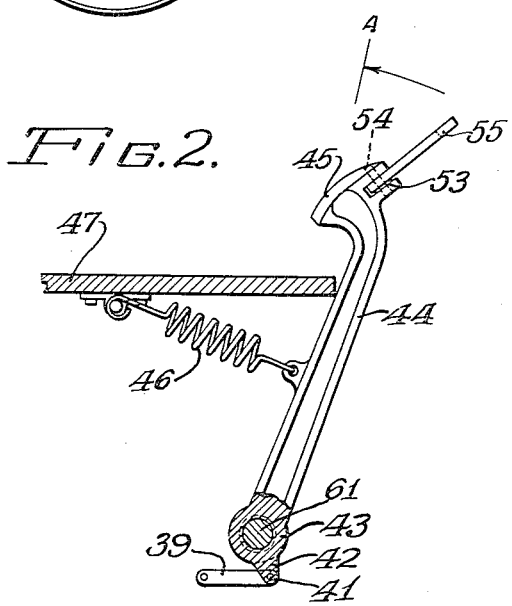
Fig. 2 is a sectional view taken on the line 2—2 of Fig. 1 and showing a brake pedal together with the mounting therefor and a connecting link for operating a valve in a brake line branch associated with such pedal.
Figure 3:
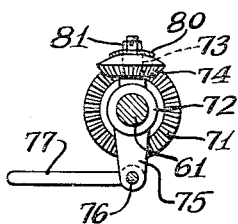
Fig. 3 is a fragmentary sectional view taken on the line 3—3 of Fig. 1 illustrating part of the differentially force-applying mechanism.

In the apparatus shown in Figs. 1, 2 and 3 diagrammatically represented vehicle brakes 11 and 12 for the traction wheels of a vehicle, not shown, are energized by creation of fluid pressure in branches 13 and 14 of a fluid line 15 leading from a master cylinder unit 16—17 into a valve casing 20. Sections of the fluid line branches in the valve casing contain valve members 18 and 19 normally held in the valve-closing position upon valve seats 21 and 22 by means of springs 23 and 24. Valve members 18 and 19 are axially fluted in their outer peripheries to facilitate the flow of fluid therepast and through the conduit branches 13 and 14 when these valve members are unseated from the seats 21 and 22.

Bores 25 and 26 in the valve casing 16 slidably contain hollow plungers 27 and 28 which serve as chambers for captive springs 29 and 31 which urge the heads 32 and 33 of valve stems 34 and 35 against stops 36 and 37 at the left ends of the plungers 27 and 28. The heads 32 and 33 are axially fluted in their exterior peripheries to provide breathing means so these heads are free to move inwardly of the plungers incident to compressing the springs 29 and 31. The left ends of the valve stems 34 and 35 are engageable with the valve members 18 and 19 for unseating these members when such stems are forced leftward from the positions shown in Fig. 1.

Valve-stem-operating plunger 27 is pivotally connected by a pin 38 with the rearward ends of links 39, Figs. 1 and 2, which have their forward (rightmost) ends pivotally connected at 41 with a short arm 42 projecting radially downwardly from a hub 43 of a brake operator 44 in the form of a pedal having a foot-receiving pad 45. A spring 46 connected between the pedal or manually advanceable control member 44 and a floor 47 of the vehicle operator's section of the vehicle normally holds this member 44 at the retracted limit of its operating range A—B. This causes the valve stem 34 to be retracted forwardly from the valve member 18 so it can seat as illustrated in Fig. 1.

Valve stem plunger 28 is connected with a hub 48 of a brake operator 49 by a pin 51 and links 52 constructed similarly to the pin 38 and links 39. The forward ends of the links 52 connecting with an arm, not shown, projecting downwardly from the hub 48 similarly to the arm 42 in Fig. 2.

Pedal pad 45 contains a slot 53 traversed by a pivot pin 54 for a pad-connecting latch 55. When the latch 55 is in the position shown the pedals 44 and 49 are independently operable but when the latch is pivoted into the dotted line position to also occupy a portion of a slot 56 in the pad 57 of the pedal 49 the two pedals will be constrained for movement in concert.

Pedal 44 has its hub 43 mounted upon and constrained for rotation with a shaft 61 having one end journalled at 62 in a frame 63. The opposite end of the shaft 61 extends into a casing portion 64 of the frame and into the hub 65 of a beveled gear 66. This gear which is constrained for rotation with the shaft 61 is journalled at 67 in the casing 64. The hub 48 of the brake operator or pedal 49 is pivotally mounted on the shaft 61 and has an end extension 68 journalled at 69 in the casing 64. Hub extension 68 has a beveled gear 71 constrained for rotation therewith. A planet carrier 72 is journalled upon a section of the shaft 61 between the two beveled gears 66 and 71 and has journalled on a radially extending bearing portion 73 thereof a planet gear 74 which is mutually meshed with the gears 66 and 71. An arm 75 of the carrier 72 is pivotally connected at 76 with a thrust member 77 which projects into a recess 78 of the master-cylinder plunger 17 for advancing this plunger incident to compressing a return spring 79 therefor.

The gearing and parts associated therewith in the casing 64 constitute force-applying means and together with manually advanceable control members in the form of the pedals 44 and 49 compose control means for the fluid compressing unit 16—17. Absence of back-lash in this control means is assured by a Bellville spring 80 which reacts against a retention nut 81 on the carrier extension 73 while pressing the planet gear 74 into wedging meshed relation with the gears 66 and 71.

The brake operators or manually advanceable brake control members 44 and 49 are normally held retracted by respectively associated springs 46 against a stop which may be a section of the operator's station floor 47 as illustrated in Fig. 2. Assuming that the brake operator 49 is advanced from the retracted limit A of the operating range of movement A—B, Fig. 2, the gear 71 constituting a first component of the force-applying means in the casing 64 will be rocked clockwise, as viewed in Fig. 3. The gear 66 constituting a second component of this force-applying means is thus caused to be reacted upon by the planet gear 74 constituting a third component of this force-applying means whereby the carrier 72 is caused to rock clockwise, as viewed in Fig. 3, one-half the distance that the gear 71 is rocked. Meanwhile the gear 66 is prevented from rocking counter-clockwise by the shaft 61 and the operator 44 which presses against the stop preventing retractive movement thereof beyond the A limit of its operating range A—B. This clockwise rocking of the carrier 72 forces the connecting rod 77 and the compressor plunger 17 leftward for operating the fluid compressing unit 16—17. Corresponding operation of the fluid compressing unit is attained when the brake operator 44 is advanced from the retracted limit A of its operating range A—B while the operator 49 remains at its retracted limit of its operating range. When this alternative operation occurs the gear 66 will be rocked clockwise to cause rolling of the planet gear 74 in a clockwise direction along the toothed periphery of the gear 71 to cause clockwise rocking of the carrier 72 one-half the angular distance of the gear 66. Pursuant to this action counter-clockwise rotation of the gear 71 is prevented by the brake operator 49 reacting against the stop preventing retraction thereof beyond the operating range limit A. For each increment of advance for brake operator 44 into the range A—B, connecting rod 77 and the fluid compressing unit plunger 17 will be moved into the cylinder 16 a distance equal to such movement for corresponding increments if the brake operator 49 were being individually operated. Attendant to rocking of the brake operator 49 and fluid compressing advance of the master-cylinder plunger 17 for expelling fluid into the conduit 15, the linkage 52—26—31 connected between the operator hub 48 and the valve stem 35 will force the valve member 19 from its seat 22. Meanwhile the valve member 28 remains seated whereby fluid discharged into the conduit 15 is introduced into the conduit 14 for energizing the brake 12 to a degree correlated with the amount of advancement of the brake operator 49 into the operating range A—B. Alternatively when brake operator 44 is advanced and it is operative through the force-applying means in the casing 64 for operating the fluid compressing unit 16—17, the valve member 19 is allowed to remain seated whereas the linkage 39—27—29 operates the valve stem 34 for unseating the valve member 18 whereby the fluid discharged from the cylinder 16 through the conduit 15 is directed into the conduit 13 for energizing the brake 11 to a degree correlated with the advancement of the brake operator 44. Said linkages 52—26—31 and 39—27—29 constitute means for operating the valve means 19—18 to establish communication between the master cylinder and each brake concurrently with operation of the operator associated therewith. Springs 29 and 31 in the valve stem operating plungers 27 and 28 are strong enough to prevent projection of the valve stems 34 and 35 into these plungers until the valve members 18 and 19 are fully opened, whereupon these springs accommodate projection of the stems to avoid interference with further advancement of the brake operators 44 and 49.

The valves 18 and 19 constitute brake-selective valve means since they serve as means for determining to which brake the compressed fluid flows. Because these valves direct the fluid selectively to the brakes such valves are also fluid directing means, and, since energy is transmitted with the directed fluid, such valves are likewise energy-directing means.

When the brake operators 44 and 49 are simultaneously advanced, the linkages 39 and 52 will operate the valve stems 34 and 35 for unseating both valve members 18 and 19 so that fluid discharged from the compressing unit 16—17 will be directed at equal pressure into both of the conduits 13 and 14 for simultaneously energizing the brakes. Inasmuch as twice the quantity of fluid is necessary for energizing both of the brakes as for energizing either thereof, this simultaneous energization of the brakes would entail greater advance of the brake operators 44 and 49 into the range A—B for attaining the same degree of braking energization for each brake if it were individually operated, excepting for the connection of the differentially-acting force-applying means 66—71—72—74 in the casing 64 which causes the carrier 72 to oscillate at the same speed as the gears 71 andn 66 when these two gears are rocked simultaneously. Consequently when the brake operators 44 and 49 are simultaneously operated the linear travel of the plunger 17 in the fluid compressing unit 16—17 is at twice the rate per unit of brake operator advance as when either of these brake operators is individually advanced. The differentially-acting force-applying means 66—71—72—74 can therefore be regarded as means for causing the compressing unit 16—17 to expel fluid quantitatively according to arithmetically combined distance of advancement of the control members 44 and 49, or as means for causing increase in the expelled quantity per unit distance of control member advancement when the control members are advanced in concert with reference to the expelled quantity when they are advanced individually. The operator of the vehicle need detect no change in the amount of pedal pad travel nor any change in the variation in the operating range for the pedal pads when attaining any desired braking energization for the brakes individually or simultaneously.

The fluid compressing unit 16—17 and the force-applying means 66—71—72—74 in the casing 64 together constitute an adjustable brake energization regulating unit operable by the manually advanceable control members 44 and 49 to obtain this uniform operating characteristic of the brakes irrespective of whether they are operated simultaneously or individually. The gear 66, together with the planet gear 74, the carrier 72 and the connecting rod 77 constitute a force-applying structure between the control member 44 and the fluid compressing unit 16—17; whereas the gear 71 with the gear 74, the carrier 72 and the connecting rod 77 constitute a force-applying structure between the control member 49 and the fluid compressing unit 16—17.

*Figure 4 embodiment*

Most of the elements of the apparatus shown in Figure 4 correspond to parts already described in connection with the first embodiment and the specification is expedited by simply designating the parts in Fig. 4 corresponding to those in the first embodiment by the same respective reference characters, with the addition of the suffix "a."

In the operation of the Fig. 4 apparatus, pressing leftward upon the brake operator 44a, which is shown in its retracted position, will cause the link 39a to be moved rearward or rightward, thereby opening a valve 18a—21a and moving the upper end of a walking beam 101 rearward for operating a master cylinder 16a—17a while the lower end of the walking beam reacts against a pivot Z thereof which prevents forward movement of the lower end of such beam. Pivot Z and link 52a are retained against forward movement by the brake operator 49a which is in its most retracted position. The master cylinder thus operated expels fluid into the conduit 15a, thence past the valve 18a—21a and through the conduit 13a for engaging the brake 11a with a force proportional to the advancement of the brake operator 44a and the degree of operation of the master cylinder 16a—17a. When the brake 11a is engaged to a degree corresponding to a normally maximum braking engagement, the pivot X between the upper end of the walking beam 101 and the link 39a will have moved rearwardly into coincidence with the line C which radiates from the forward position shown for the pivot Z. This will cause shifting of the pivotal connection Y between a center portion of the beam 101 and the piston rod 77a to position Y'. When the brake operator 44a is released it will be returned to the position shown by the associated spring 46a. Incident to this retractive motion of the brake operator, the master cylinder will be deenergized by forward or leftward motion of the connecting rod 77a and the valve 18a—21a will be closed. A check valve 102 is provided in the valve plunger 18a to assure that no fluid will be trapped under pressure in the conduit 13a for holding the brake 11a partly engaged. This check valve 102 also permits the escape of fluid from the brake 11a to assure no undesired partial engagement of the brake by heat expansion of fluid therein at any time. A similar check valve (not shown) is provided in the valve plunger 19a.

Manual advancement of the brake operator 49a causes rearward motion of the linkage 52a and opening of the valve 19a—22a and rearward motion of the lower end of the walking beam 101 for operating the master cylinder 16a—17a while forward motion of the upper end of the walking beam is prevented by the brake operator 44a which is then at its retracted limit. During this operation of the master cylinder the fluid expelled into the conduit 15a is forced past the open valve 19a—22a and through the conduit 14a to the brake 12a. Full engagement of the brake 12a occurs when the brake operator has been advanced a distance for carrying the walking beam into coincidence with the line B. When the brake operator 49a is released the parts will be restored to the Fig. 4 position by the associated spring 46a and fluid can return to the master cylinder through the conduit 14a past the valve 19a—22a and through the conduit 15a to release the brake before the valve becomes closed. Brake operators 44a and 49a will have their foot pads 45a and 57a in side-by-side relation, as illustrated for the pedal pads in Fig. 1 to facilitate simultaneous advancement of the brake operators by a single foot of the operator. When these operators are simultaneously advanced, both valves 18a—21a and 19a—22a will be opened and the upper and lower ends of the walking beam 101 will be moved rearwardly the same distance whereby the center portion of this beam and the piston rod 77a will be moved twice the distance per unit advancement of either end of the beam when such ends are moved individually. This causes the master cylinder 16a—17a to be operated at twice the rate so that fluid can be supplied simultaneously to the brakes to cause engagement thereof when each of the brake operators 44a and 49a has been operated the same distance as when individually operated. The brakes will be fully engaged when the pivots X, Y and Z all coincide with a line A—A. When the brake operators 44a and 49a are simultaneously released their springs 46a will return the parts to the position shown in Fig. 4 to cause disengagement of both brakes.

The links 39a and 52a, together with the walking beam 101 and the pivotal connections X, Y and Z constitute force-applying means corresponding to the differential force-applying means in the casing 64 of the first embodiment. The link 39a constitutes one component of such force-applying means and is operable while reacting upon a second component 52a thereof to advance a third component Y at one-half the distance of movement of the component 39a. Similarly the component 52a is movable while reacting through the beam 101 against a second component formed by the element 39a to cause advancement of the third component Y at a portion of the rate of the component 52a for operating the master cylinder. When the components 39a and 52a are simultaneously advanced, the third component Y will be advanced in concert therewith for doubling the degree of master-cylinder operation per unit of movement of the components 39a and 52a if these were advanced individually.

Having thus described a limited number of embodiments of the invention with the view of clearly and concisely illustrating the same, I claim:

1. In apparatus for selectively controlling energization of fluid-operated brakes, a master cylinder, fluid-conducting lines communicative between the master cylinder and said brakes, brake-selective valve means interposed in said fluid lines to normally preclude flow of fluid from the master cylinder to the brakes, brake operators respectively for said brakes, force-applying means interconnecting said operators and the master cylinder, said force-applying means including two components respectively movable with said operators and a third component for operating the master cylinder and movable with either of the first components but at a diminished rate with respect thereto for operating the master cylinder attendant to movement of either of the two components with its associated operator, the third component being moveable at the same rate as the first two components attendant to concert movement of the first two components, and means for operating the valve means to establish communication between the master cylinder and each brake concurrently with operation of the operator associated therewith.

2. In selective braking apparatus, a plurality of fluid-operated brakes, a fluid compressing unit including a compressing chamber and means operable to expel fluid from such a chamber compressively to the brakes to energize them with a braking intensity according to the quantity of expelled fluid, control means in control of the fluid compressing unit and including manually advanceable control members respectively for the brakes, the control means being operable pursuant to advancement of said control members individually or in concert to cause such expelling of fluid by the compressing unit from said chamber thereof solely to the associated brakes of the advanced of such members, and said control means also including means for causing the compressing unit to expel fluid quantitatively from said chamber according to arithmetically combined distance of advancement of the control members.

3. In selective braking apparatus, a plurality of fluid-operated brakes, a fluid compressing unit including a compressing chamber and means operable to expel fluid from such chamber compressively to the brakes to energize them with a braking intensity according to the quantity of expelled fluid, control means in control of the fluid compressing unit and including manually advanceable control members respectively for the brakes, the control means being operable pursuant to advancement of said control members individually or in concert to cause such expelling of fluid by the compressing unit from said chamber thereof solely to the associated brakes of the advanced of such members, and said control means also including means causing increase in the expelled quantity of fluid per unit distance of control member advancement when such members are advanced in concert with reference to the expelled quantity when they are advanced individually.

4. In selective braking apparatus, a plurality of fluid-operated brakes; a fluid compressing unit operable to expel fluid compressibly to the brakes to energize them with a braking intensity according to the quantity of expelled fluid; fluid directing means interposed between the fluid compressing unit and the brakes and operable to direct the fluid from the compressing unit individually or collectively to the brakes; and control means including manually advanceable control members respectively for the brakes; means interposed between the control members and the fluid-directing means and adapted to operate such directing means for directing fluid from the fluid compressing unit solely to the brakes respectively associated with the advanced of said control members, and said control means also including force-applying structures interposed respectively between each of the control members and the fluid compressing unit, each of said force-applying structures including means reacted on by the other of such structures while applying operating force to the fluid compressing unit each of said force-applying structures being operable pursuant to advance of its associated control member to operate the fluid compressing unit for expelling a quantity of fluid proportional to the advance of such control member, and said force-applying structures being adapted to accumulatively operate the fluid compressing unit pursuant to simultaneous advance of the control members to cause such unit to expel substantially twice the quantity of fluid that is expelled when only either of the control members is advanced.

5. In selective braking apparatus; a plurality of fluid-operated brakes; a master cylinder; brake-line conduit means leading from said master cylinder and having branches for respective communication with said brakes; normally closed valves respectively in said branches; a differential gear unit including coaxial axially spaced gears, a planet gear carrier pivotally mounted coaxially with said gears, a planet gear journalled on said carrier and disposed between the axially spaced gears in meshed relation therewith; means providing an operating connection between said carrier and the master cylinder for operating the latter pursuant to pivotal movement of the carrier; shafts respectively connected with said axially spaced gears and independently operable for rotating their associated gears to cause pivotal movement of the carrier; and valve operating means connected between said shafts and said valves to open a valve respectively associated with each shaft pursuant to rotational movement thereof in the direction for operating the master cylinder.

6. In selective braking apparatus; a plurality of fluid-operated brakes; a master cylinder having a piston rod end; a differential-receiving frame assembled with said end of the master cylinder; a differential gear unit comprising inner and outer concentric shafts journalled in said frame for rotation about their principal axes which extend transversely of the master cylinder axis, said shafts having adjacent end portions in proximity with said end of the master cylinder, gears respectively upon and constrained for rotation with said shaft end portions, a planet gear carrier pivotally mounted coaxially of said shaft end portions, a planet gear journalled upon said carrier about an axis extending radially thereof and mutually meshed with the first named gears; a piston rod disposed between said carrier and the master cylinder for operating the latter pursuant to pivotal motion of the carrier, said shafts having axially adjacent end portions remote from the master cylinder; valve casing means connected with said frame in alignment with said remote end portions of the shafts radially thereof; brake line conduit means leading from said master cylinder to the valve casing means and including branches in said casing means for respective communication with said brakes; normally closed valves in said casing means and respectively in said conduit branches, said shafts being individually or simultaneously pivotal to transmit operating force through said gears and the piston rod for compressibly operating the master cylinder; and valve operating means connected between the remote shaft end portions and said valves to open a valve respectively associated with each shaft pursuant to pivotal movement thereof in causing operation of the master cylinder.

7. In selective braking apparatus; a plurality of fluid-operated brakes, a master cylinder, brake-line conduit means leading from said master cylinder and having branches for respective communication with said brakes, normally closed valves respectively in said branches, a differential motion transmitting mechanism including a walking beam, means providing an operating connection between an intermediate portion of said walking beam and the master cylinder to operate such cylinder pursuant to advance of said intermediate portion transversely of the beam, brake operating members respectively for said brakes and operably connected with respective end portions of the beam for advancement of such end portions, and means connecting said operating members respectively with the valves in the branches leading to the brakes associated with the control members, the latter named connecting means being adapted to open said valves attendant to operation of their brake operating members for advancing their associated ends of the walking beam.

8. In selective braking apparatus; a plurality of fluid-operated brakes; a master cylinder; brake-line conduit means leading from said master cylinder and having branches for respective communication with said brakes; valve means interposed between the master cylinder and the conduit branches and selectively operable to accommodate concurrent communication of the master cylinder through said branches with the brakes or alternative communication through said branches with the brakes respectively communicative therewith; a differential gear unit including coaxial axially spaced gears, a planet gear carrier pivotally mounted coaxially with said gears, a planet gear journalled on said carrier and disposed between the axially spaced gears in meshed relation therewith; means providing an operating connection between said carrier and the master cylinder for operating the latter pursuant to pivotal movement of the carrier; shafts respectively associated with said conduit branches and respectively connected with said axially spaced gears and independently operable for rotating their associated gears to cause pivotal movement of the carrier; and valve operating means connected between said shafts and said valve means to operate such valve means for accommodating said communication through only the respectively associated one of said conduit branches pursuant to individual rotation of said shafts in the direction for operating the master cylinder and to operate said valve means for accommodating concurrent communication of the master cylinder through said conduits pursuant to concurrent rotational movement of the shafts.

9. In selective braking apparatus; a plurality of fluid-operated brakes; a fluid compressing unit including a fluid compressing chamber; conduit means communicative between said chamber and said brakes for imposing the pressure of the compressed fluid thereon to energize them with a braking intensity according to the pressure of such fluid; a force-applying differential structure comprising a planet gear carrier in operating relation with the fluid compressing unit and rockable to compress the fluid in said chamber; a planet gear journalled on said carrier, and coaxial driving gears in differential driving relation with the planet gear; valve means interposed in said conduit means and settable to selectively direct the fluid from the compressing chamber through the conduit means individually to said brakes or concurrently thereto; manually advanceable control members respectively associated with said brakes and respectively drivingly connected with said driving gears of the differential structure, each manual control member being operable when individually advanced to operate the gear connected therewith for rocking the differential structure carrier at one speed relatively to the speed of advance of such member and said control members being operable through the gears connected therewith when concurrently advanced to rock the differential carrier at an increased speed with respect thereto; and valve operating means disposed between said manual control members and said valve means, said manual members being operable through said operating means to set the valve means for directing fluid from the compressing chamber to only the brake respectively associated with the advanced of such manual members pursuant to their individual advancement and to direct the fluid to both brakes when the manual members are concurrently advanced.

References Cited in the file of this patent

UNITED STATES PATENTS

| | | |
|---|---|---|
| 1,822,900 | Messier | Sept. 15, 1931 |
| 2,213,947 | Bowen | Sept. 10, 1940 |
| 2,241,214 | Milster | May 6, 1941 |